(12) United States Patent
Satoh et al.

(10) Patent No.: US 6,747,691 B1
(45) Date of Patent: Jun. 8, 2004

(54) APPARATUS CAPABLE OF DETERMINING SHAKE OF THE APPARATUS RELATIVE TO AN OBJECT

(75) Inventors: Tomonori Satoh, Osaka (JP);
Yoshihiro Hara, Osaka (JP); Toshihiro Hamamura, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/149,943

(22) Filed: Sep. 9, 1998

(30) Foreign Application Priority Data

Sep. 9, 1997 (JP) .................................. 9-244415
Sep. 9, 1997 (JP) .................................. 9-244416
Sep. 9, 1997 (JP) .................................. 9-244417

(51) Int. Cl.$^7$ .......................................... H04N 5/228
(52) U.S. Cl. .............................................. 348/208.5
(58) Field of Search .......................... 348/208.4, 208.5, 348/208.6, 208.12, 208.14, 208.16, 155; 396/53, 55, 52; 359/554

(56) References Cited

U.S. PATENT DOCUMENTS

| 4,783,677 | A | | 11/1988 | Hamada et al. |
| 4,908,645 | A | | 3/1990 | Higashihara et al. |
| 4,998,124 | A | | 3/1991 | Ishida et al. |
| 5,138,356 | A | | 8/1992 | Nakamura et al. |
| 5,327,190 | A | | 7/1994 | Nakamura et al. |
| 5,561,498 | A | * | 10/1996 | Sekine et al. .................. 396/53 |
| 5,729,290 | A | * | 3/1998 | Tokumitsu et al. ......... 348/349 |
| 5,734,933 | A | * | 3/1998 | Sekine et al. .................. 396/55 |
| 6,407,771 | B1 | * | 6/2002 | Kanbara et al. ....... 348/207.99 |

FOREIGN PATENT DOCUMENTS

| JP | 60-214325 | | 10/1985 |
| JP | 63-166369 | * | 9/1988 |
| JP | 08-51566 | | 2/1996 |

* cited by examiner

*Primary Examiner*—Tuan Ho
(74) *Attorney, Agent, or Firm*—Sidley Austin Brown & Wood LLP

(57) ABSTRACT

A camera is provided with: a detector for detecting a shake amount of the apparatus with respect to an object at an interval; a calculator for calculating a shake speed and a shake acceleration rate based on detected shake amounts, and calculates an estimative shake amount based on a calculated shake speed, a calculated shake acceleration rate, and a coefficient k (0<k<1) on an assumption that a shake is uniformly accelerated motion, the coefficient k being a multiplier for the calculated shake acceleration rate; and a corrector for executing a shake correction in accordance with a calculated estimative shake amount.

8 Claims, 12 Drawing Sheets

APPARATUS CAPABLE OF DETERMINING SHAKE OF THE APPARATUS RELATIVE TO AN OBJECT

This application is based on patent application Nos. 9-244415, 9-244416, 9-244417 filed in Japan, the contents of which is hereby incorporated by reference.

BACKGROUND OF THE INVENTION

This invention relates to an apparatus capable of shake estimation to correct a displacement of an object light image caused by a shake of the apparatus relative to an object.

In recent years, there have been marketed video cameras and electronic still cameras having a function of shake correction. In such a camera, a CCD (Charge Coupled Device) detects a shake amount of an optical image pickup system relative to an object due to a camera shake, and a shake correction is performed in such a manner as to cancel the shake amount. This shake correcting function is also applied to usual halide film cameras.

Japanese Unexamined Patent Publication No. 8-51566 discloses a camera with a shake correcting function as follows. A solid state image sensor such as CCD is provided to pick up an object light image for detecting a shake amount. An estimative shake amount is calculated considering time required from start of shake detection to completion of driving of a shake correction optical system to cancel the detected shake amount, including time for the calculation of estimative shake amount and driving the optical system. The shake correction optical system is driven based on the calculated estimative shake amount.

Further, various correction manners for estimation of a moving object to ensure an optimum focusing control have been proposed.

U.S. Pat. No. 4,998,124 discloses a manner of narrowing the distribution of focus detection results to multiply a speed of a moving object by a coefficient ½.

U.S. Pat. No. 4,998,124 further proposes an object speed calculation for a moving object follow-up mode when executing auto-focusing. In this calculation, an estimative speed is obtained by averaging an instant defocus amount and a defocus amount prior to the instant defocus amount, and multiplying the average by ½. Also, this publication discloses an average estimative mode wherein if latest three focusings are failed, and the respective directions of latest two detection data do not coincide with each other, an average of the latest three detection data is calculated as defocus data.

U.S. Pat. No. 4,908,645 discloses a calculation using an analogous quadratic function. Specifically, an estimative moved amount of an moving object is calculated using three detection data for auto-focusing in the case where the moved amount of the object is large. The coefficient for the quadratic function is changed in accordance with detection intervals.

U.S. Pat. No. 5,327,190 proposes a manner of providing a linear correction function and a quadratic correction function to correct the focusing speed. The correction functions are switchable over. In the linear function, a moving speed is multiplied by a coefficient. In the quadratic function, a moving speed is squared, and the squared speed is multiplied by a coefficient.

U.S. Pat. No. 5,138,356 discloses a calculation of an estimative speed of a moving ofject. Three moving speeds are calculated based on latest five defocus amounts. These moving speeds are averaged to obtain a provisional estimative speed. Further, an average of four provisional estimative speeds is calculated, and applied to an analogous quadratic function to obtain a final estimative speed.

U.S. Pat. No. 4,783,677 proposes a calculation for a moving object follow-up mode. In this calculation, an estimative speed is obtained by calculating an average of a series of defocus data while adding latest data with more weight.

Japanese Unexamined Patent Publication No. 60-214325 discloses an auto-focusing device comprising a defocus amount detector for detecting a defocus amount and an object movement detector for detecting a moved amount of an object based on a detection result by the defocus amount detector. Detected defocus amount is corrected on time basis using a detection output of the object movement detector to drive a focusing lens based on a corrected defocus amount. In this publication, the defocus amount at an intermediate point of an integration time is obtained by calculating an average of adjacent two defocus amounts, irrespective of calculation of the moved amount of the object.

However, such estimation of a moving object cannot be applied to calculation of an estimative shake amount. It could be appreciated to calculate an estimative shake amount using a quadratic function on the assumption that a camera shake is a uniformly accelerated motion. This can provide a precise estimation at a very instant moment. However, for calculation of an estimative shake amount, attention must be paid to the fact that the acceleration of camera shake varies at all the time, although the shake range is not actually so large. In the period from start of shake detection to completion of shake correction, there is a likelihood that a calculated estimative shake amount becomes void, causing an imperfect correction.

SUMMARY OF THE INVENTION

It is an object of the present invention to provide an apparatus capable of shake estimation which has overcome the problems residing in the prior art.

According to an aspect of the invention, an apparatus comprises: a detector which detects a shake amount of the apparatus with respect to an object at an interval; a calculator which calculates a shake speed and a shake acceleration rate based on detected shake amounts, and calculates an estimative shake amount based on a calculated shake speed, a calculated shake acceleration rate, and a coefficient k (0<k<1) on an assumption that a shake is uniformly accelerated motion, the coefficient k being a multiplier for the calculated shake acceleration rate; and a corrector which executes a shake correction in accordance with a calculated estimative shake amount.

According to another aspect of the invention, an apparatus comprises: a detector which detects a shake amount of the apparatus with respect to an object at an interval; a selector which selects, in accordance with a predetermined reference time space before a particular detection time point, a plurality of shake amounts among shake amounts detected by the detector; and a calculator which executes calculation on a shake of the apparatus based on detected shake amounts selected by the selector.

According to still another aspect of the invention, an apparatus comprises: a detector which detects a shake amount of the apparatus with respect to an object at an interval; and a calculator which calculates an average shake amount of a plurality of shake amounts continuously detected by the detector.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
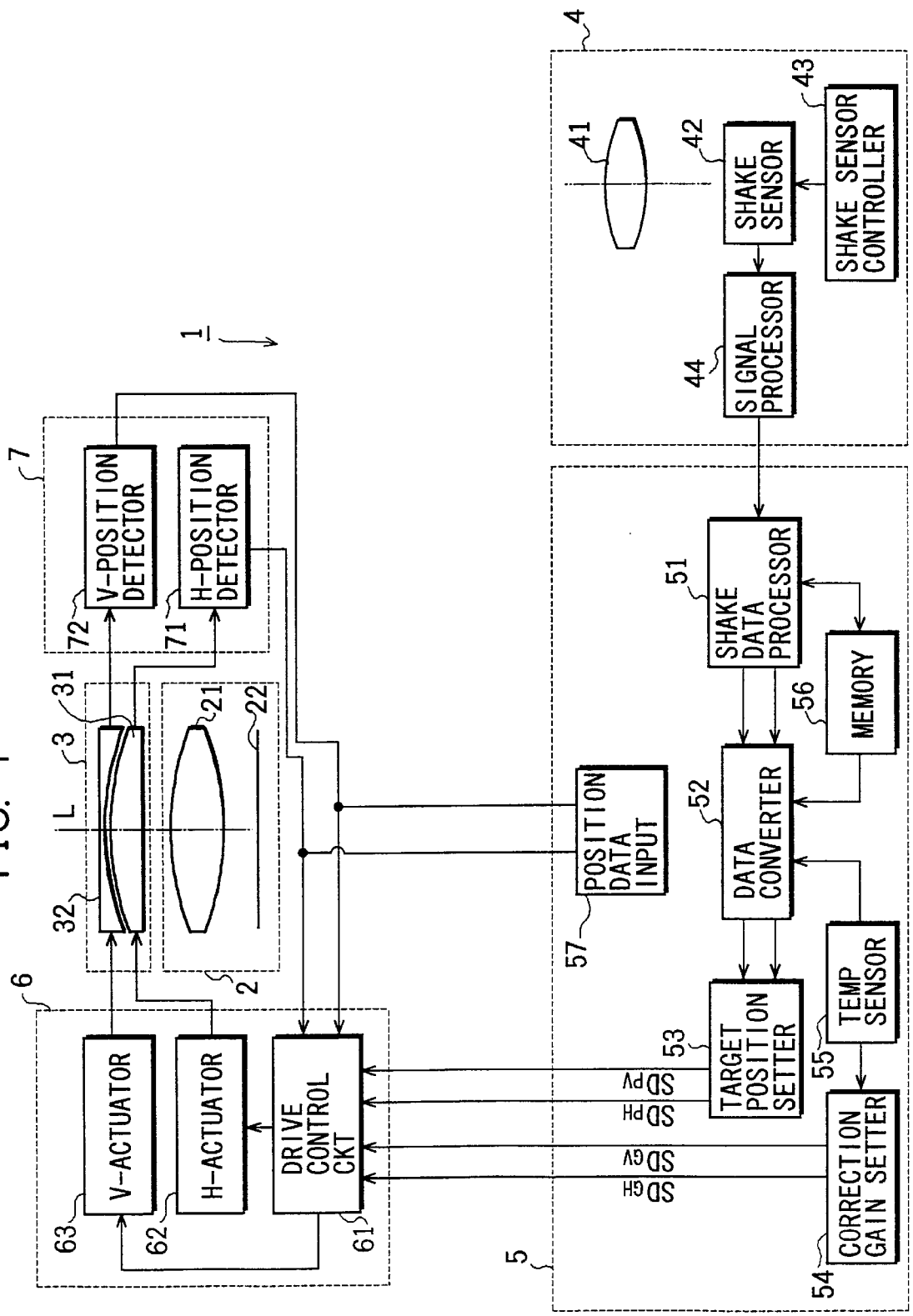
FIG. 1 is a block diagram showing a camera embodying the present invention.

FIG. 1 shows a control construction of a camera embodying the invention. A camera 1 comprises a picture taking section 2, a correction lens unit 3, a shake detecting section 4, a shake correction section 5, a driving section 6, and a position detecting section 7.

The picture taking section 2 includes a taking lens 21 having an optical axis L and a mechanism for feeding a loaded film 22 to a focus position on the optical axis L, and is adapted to take up a light image of an object.

The correction lens unit 3 includes horizontal and vertical shake correction lenses 31, 32 provided before the taking lens 21 and is adapted to correct a displacement of an object light image by means of a refraction. The horizontal and vertical correction lenses 31, 32 have optical axes parallel to the optical axis L, respectively, and are so supported as to be movable on a plane normal to the optical axis L in horizontal and vertical directions which are normal to each other.

Figure 2:
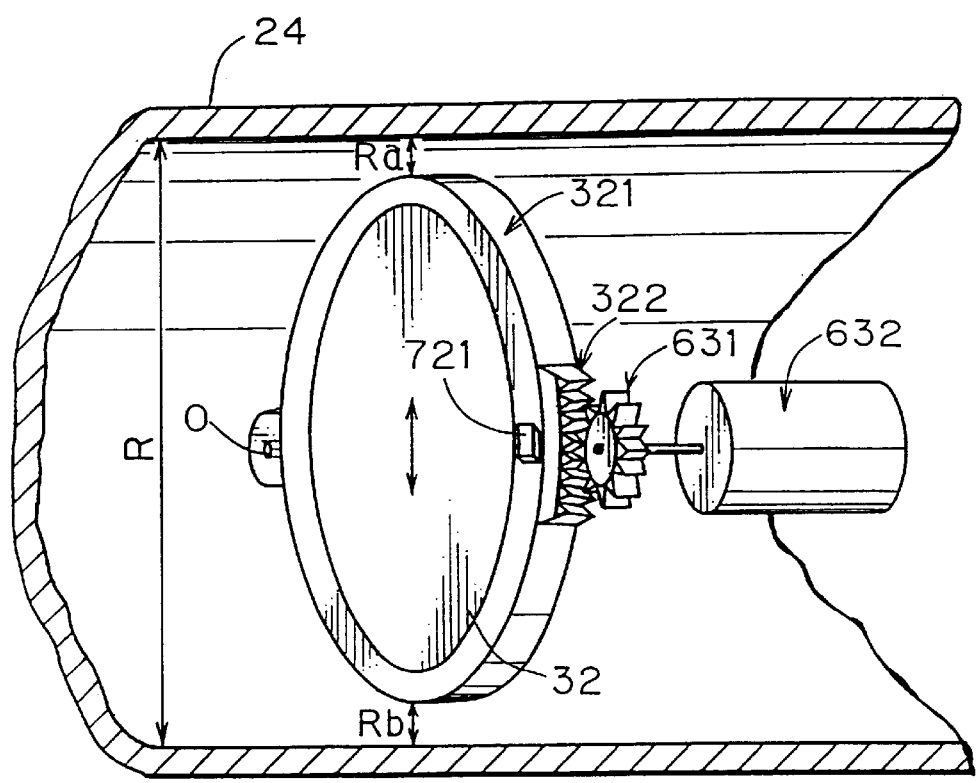
FIG. 2 is a perspective view of a vertical correction lens and its peripheral devices accommodated in a lens barrel of the camera.

FIG. 2 is a perspective view of the vertical correction lens 32 accommodated in a lens barrel 24 of the camera 1. The vertical correction lens 32 is held by a ring frame 321, and is pivotable about a pivot O on a vertical plane. A rack gear 322 is formed on a periphery of the ring frame 321 in a portion opposite to the pivot point O. A motor 632 has a pinion gear 631 which is meshed with the rack gear 322. When the motor 632 is driven, the pinion gear 631 is rotated, and the ring frame 321 is consequently pivoted on the vertical plane by the way of the rack gear 322.

As can be seen clearly from FIG. 2, the vertical correction lens 32 is movable on the vertical plane within a space R that is substantially identical to an inner diameter of the lens barrel 24. The construction of the horizontal correction lens 31 is similar to that of the vertical correction lens 32 except that the horizontal correction lens 31 is movable in a horizontal plane normal to the vertical plane on which the vertical correction lens 32 moves. Accordingly, description on the construction of the horizontal correction lens 31 is omitted herein.

The shake detecting section 4 shown in FIG. 1 includes a detection lens 41, a shake sensor 42, a shake sensor controller 43 and a signal processor 44, and is adapted to obtain image data used to detect a displacement of an object light image caused by a shake of the main body of the camera 1 with respect to the object.

The detection lens 41 has an optical axis parallel to the optical axis L of the taking lens 21, and focuses the object light image on the shake sensor 42 provided therebehind. The shake sensor 42 is an area sensor in which a multitude of photoelectric conversion elements such as CCD are arrayed in a two-dimensional manner, and is adapted to sense the object light image focused by the detection lens 41 and to generate an electrical image signal corresponding to the amount of received light. The image signal is a collection of respective pixel signals of the photoelectric conversion elements.

The shake sensor controller 43 controls the shake sensor 42 to sense the object light image for a predetermined time (time for accumulating electric charges, or simply referred to as "integration time") and to send the respective pixel signals obtained during this sensing operation to the signal processor 44. The signal processor 44 applies specified signal processings (signal amplification, offset adjustment, etc.) to the image signal sent from the shake sensor 42, and converts the analog image signal into digital image data.

The shake correction section 5 includes a shake data processor 51, a data converter 52, a target position setter 53, a correction gain setter 54, a temperature sensor 55, a memory 56, and a position data input device 57. The shake correction section 5 generates shake correction data to the driving section 6.

The temperature sensor 55 is adapted to detect an ambient temperature of the camera 1. The memory 56 includes a RAM for temporarily storing image data and shake amount data, and a ROM for storing a conversion coefficient to be used in the data converter 52.

Figure 3:
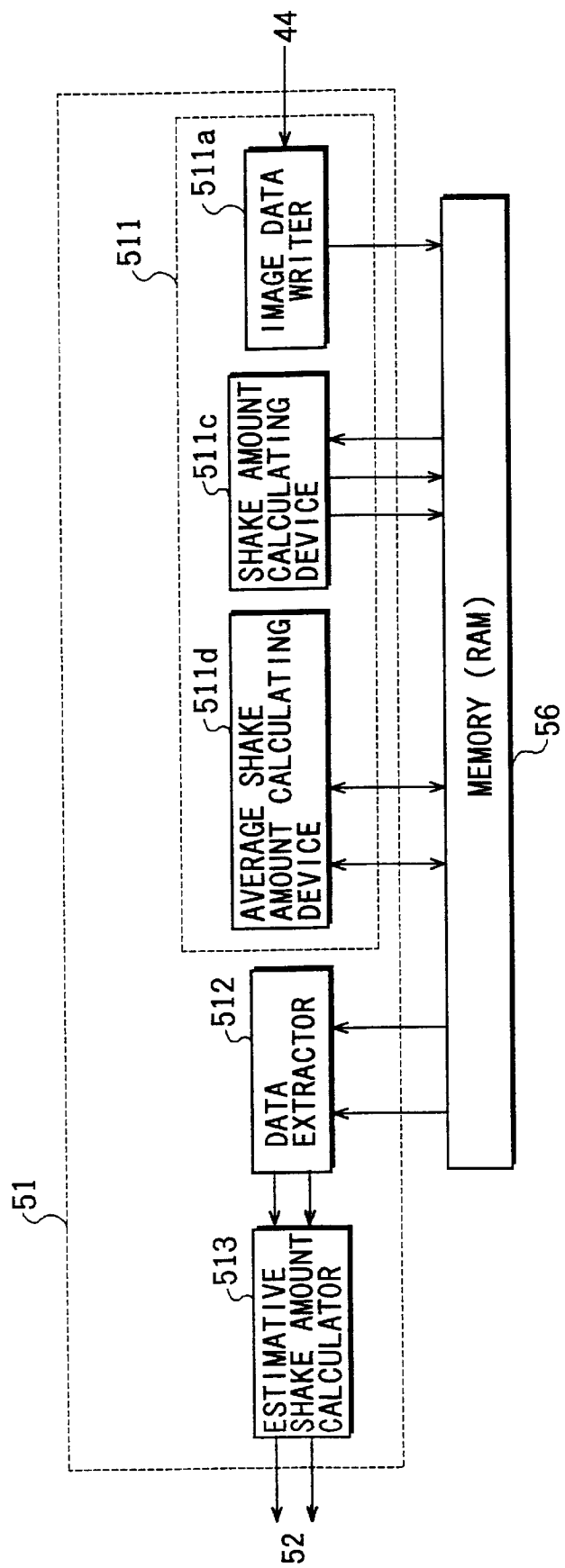
FIG. 3 is a block diagram showing a construction of a shake data processor provided in the camera.

The shake data processor 51 is described in more detail with reference to FIG. 3. Referring to FIG. 3, the shake data processor 51 comprises an actual shake amount calculator 511, a data extractor 512, and an estimative shake amount calculator 513. The shake data processor 51 calculates an actual shake amount based on image data from the signal processor 44 and then calculates an estimative shake amount based on a calculated actual shake amount.

The actual shake amount calculator 511 includes an image data writer 511a, an actual shake amount calculating device 511c, and an average shake amount calculating device 511d. The image data writer 511a writes image data sent from the signal processor 44 on a specified address of the RAM of the memory 56.

The actual shake amount calculating device 511c is adapted for calculating an actual shake amount using image data written on the memory (RAM) 56 and base image data.

Figure 4:
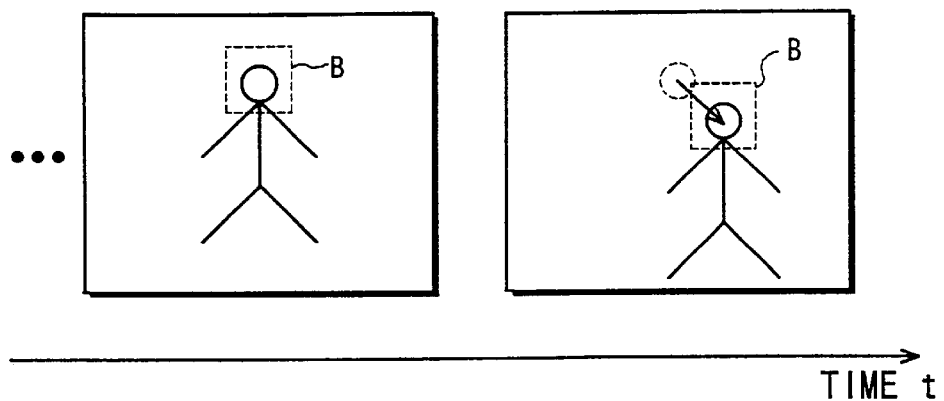
FIG. 4 is a diagram showing a selection of a base image.

Calculation of a shake amount is described. The actual shake amount calculating device 511c extracts from the memory 56 image data having a characteristic image (the region B represented by the dashed square in FIG. 4) in the state where the horizontal correction lens 31 and the vertical correction lens 32 are set in a particular position, e.g., in a center position from which the lens 31 or 32 is movable an equal distance (Ra=Rb in FIG. 2) in the opposite directions, and sets the image data as base image data.

Next, the actual shake amount calculating device 511c compares latest image data having the characteristic image with the base image data to calculate a shake amount in the unit of pixel. A shake amount ($E_H[i]$) in the horizontal direction and a shake amount ($E_V[i]$) in the vertical direction are calculated and temporarily stored in the memory 56. In shake amounts ($E_H[i]$, $E_V[i]$), i (i=0, 1, 2, 3, ... ) denotes i-th shake detection that has been executed at an interval before instant shake detection. Shake amounts of an instant shake detection are represented as $E_H[0]$, $E_V[0]$.

Figure 5:
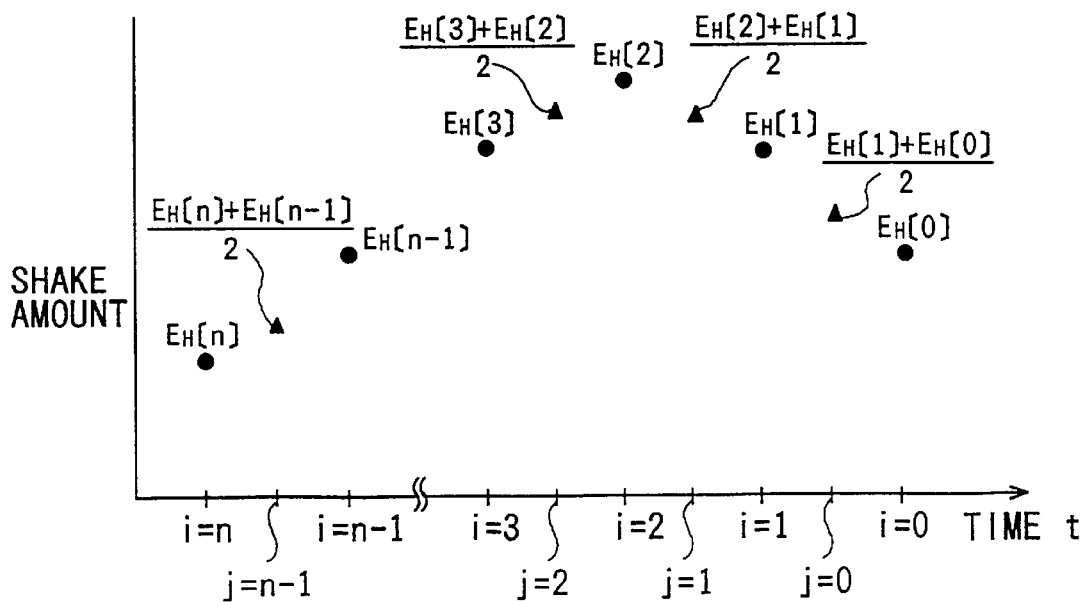
FIG. 5 is a diagram showing a calculation of an average shake amount based on shake amounts calculated by an actual shake amount calculating device provided in the camera.
Figure 6:
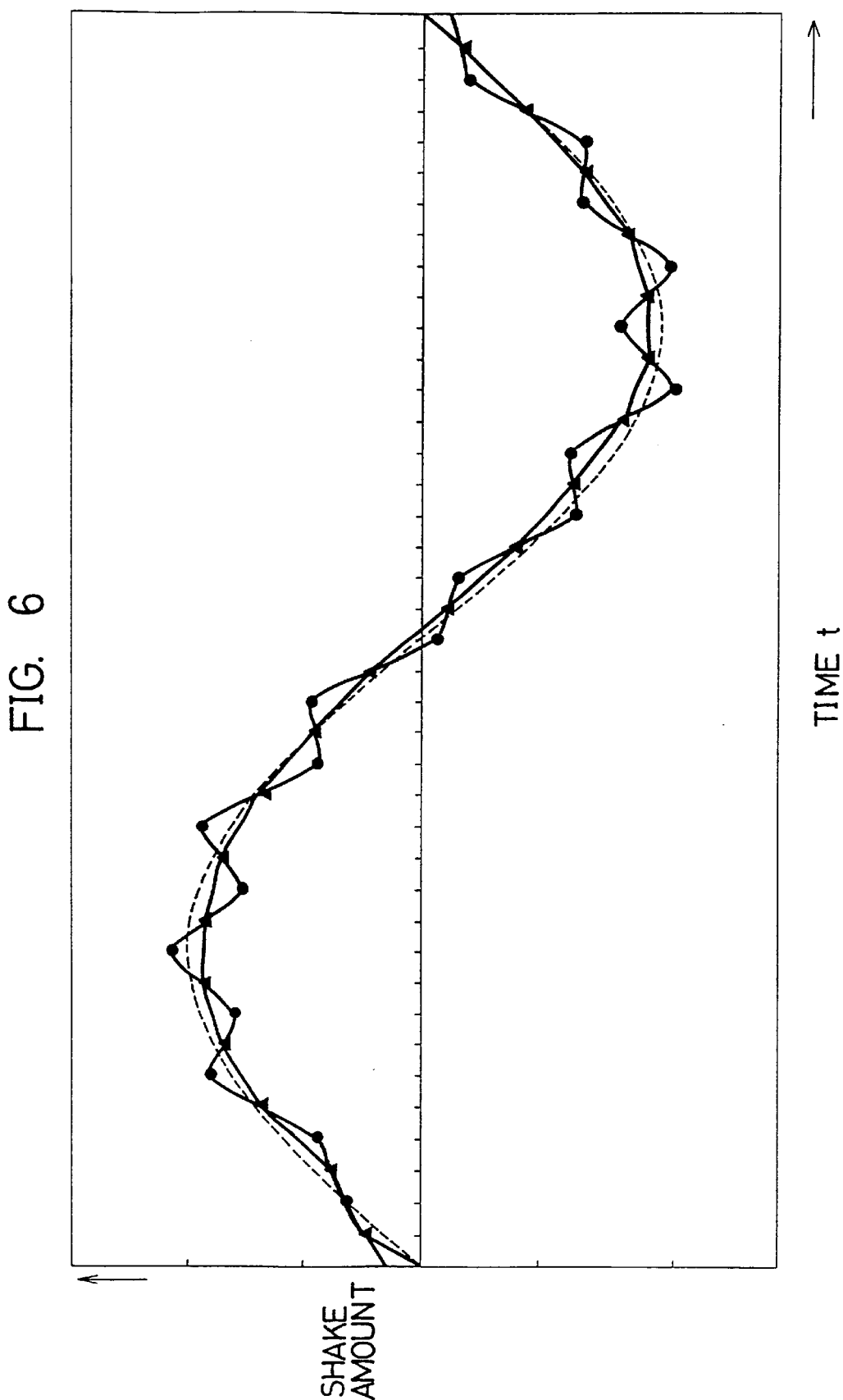
FIG. 6 is a graph showing shake amounts calculated by the actual shake amount calculating device and shake amounts calculated by an average shake amount calculating device provided in the camera.

FIG. 5 is a diagram showing a calculation of an average of shake amounts calculated by the actual shake amount calculating device 511c by the average shake amount calculating device 511d. FIG. 6 is a graph showing shake amounts calculated by the actual shake amount calculating device 511c and average shake amounts calculated by the average shake amount calculating device 511d.

The average shake amount calculating device 511d calculates an average of shake amounts calculated by the actual shake amount calculating device 511c to suppress variations in the detection output from the shake detecting section 4. Specifically, the average shake amount calculating device 511d calculates, as shown in FIG. 5, an average shake amount (indicated at the mark "▼" in FIG. 5) corresponding to a middle point in a time space using two shake amounts (indicated at the mark "●" in FIG. 5) corresponding to both ends of the time space.

More specifically, as can be clearly understood from FIG. 6, average shake amounts calculated by the average shake amount calculating device 511d, which is shown by the curve connecting the plots ▼, is closer to actual shake amounts, which is shown by the dashed curve, than shake amounts calculated by the actual shake amount calculating device 511c, which is shown by the curve connecting plots ●. Average shake amounts in the horizontal direction and average shake amounts in the vertical direction ($E_H[j]$, $E_V[j]$; j=0, 1, 2, 3, ... ) are calculated and temporarily stored in the memory 56.

Figure 7:
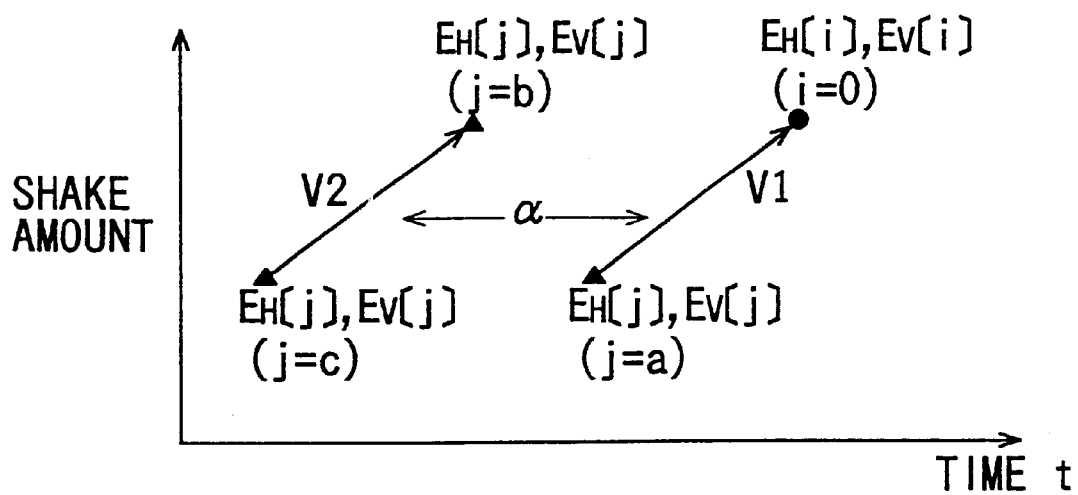
FIG. 7 is a diagram showing a relationship between shake speeds and a shake acceleration rate used in an estimative shake amount calculator and shake amounts necessary for calculating these values.

FIG. 7 is a diagram showing a relationship between shake speeds V1, V2, a shake acceleration rate α used in the estimative shake amount calculator 513 and shake amounts necessary for calculating shake speeds V1, V2, and shake acceleration rate α. As shown in FIG. 7, two shake speeds V1, V2 are necessary to obtain a shake acceleration rate α with respect to the horizontal and vertical directions, and two sets of shake amounts or four shake amounts are necessary to obtain shake speeds V1, V2, and shake acceleration rate α.

In this embodiment, the shake data extractor 512 extracts four shake amounts including a latest shake amount from the memory 56 in accordance with reference time spaces, i.e., a time space Tv for calculation of reliable shake speed, and a time space Tα for calculation of reliable shake acceleration rate. The reason why the latest shake amount data ($E_H[i]$, $E_V[i]$; i=0) is included is that simulation experiments shows that more reliable estimative shake amount is obtained when a latest shake amount is included than when a latest shake amount is excluded.

Figure 8:
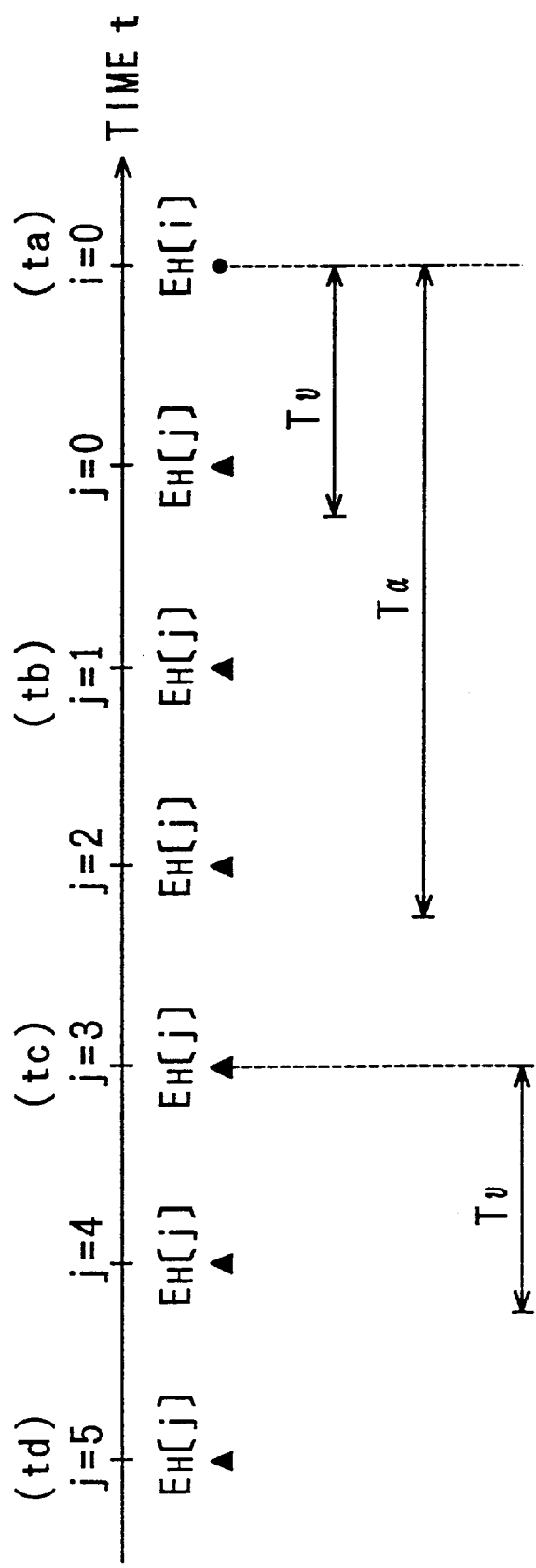
FIG. 8 is a diagram showing extraction of shake amount data.

FIG. 8 is a diagram showing extraction of shake amounts by the data extractor 512. The data extractor 512 extracts a shake amount ($E_H[i]$, $E_V[i]$; i=0) at a latest point of time (i=0). This time is hereinafter referred to as "time ta". Then, searched is a time (j=1) (hereinafter referred to as "time tb") which is prior to the time space Tv before the time ta and closest to the time ta, and extracted is a shake amount ($E_H[j]$, $E_V[j]$; j=1) at the time tb. Then, searched is a time (j=3) (hereinafter, referred to as "time tc") which is prior to the time space Tα before the time ta and closest to the time ta, and extracted is a shake amount ($E_H[j]$, $E_V[j]$; j=3) at the time tc. Finally, searched is a time (j=5)(hereinafter, referred to as "time td") which is prior to the time space Tv before the time tc and closest to time ta, and extracted is a shake amount ($E_H[j]$, $E_V[j]$; j=5) at the time td.

As mentioned above, the time Tv is a time space for calculation of reliable shake speed, and the time Tα is a time space for calculation of reliable shake acceleration rate. In this way, shake amounts extracted in accordance with the reference time spaces enables shake correction free from variations in the brightness of an object. Further, it may be preferable to set an interval time space for defining the reference time spaces based on simulation experiments so as to assure correction of actual camera shakes. It should be appreciated that the time required for calculation by the shake data processor 51 is very short compared to the reference time spaces Tv, Tα.

In the foregoing extraction, three shake amounts except for a shake amount at a latest time are extracted on the basis of times which are prior to the reference time spaces before the latest time and closest to the latest time. Alternatively, it may be appreciated to extract such shake amount data on the basis of times which are closest to the reference time spaces before the latest time, or on the basis of times which are within the reference time spaces before the latest time and most farther from the latest time.

Referring back to FIG. 3, the estimative shake amount calculator 513 calculates an estimative shake amount of the camera 1 based on the four shake amounts which are selected with respect to the horizontal and vertical directions by the data extractor 512.

Calculation of an estimative shake amount is described. First, the estimative shake amount calculator 513 calculates a shake speed and a shake acceleration rate necessary for calculating an estimative shake amount. Referring to FIG. 8, a shake speed ($V_{1H}$, $V_{1V}$) is calculated based on the latest shake amount ($E_H[i]$, $E_V[i]$; i=0) at the time ta and the average shake amount ($E_H[j]$, $E_V[j]$; j=1) at the time tb in accordance with Equation (1).

$$V_{1H} = \frac{E_H[i]_{i=0} - E_H[j]_{j=1}}{ta - tb} \quad \text{[Equation 1]}$$

$$V_{1V} = \frac{E_V[i]_{i=0} - E_V[j]_{j=1}}{ta - tb}$$

Next, a shake speed ($V_{2H}$, $V_{2V}$) is calculated based on the average shake amount data ($E_H[j]$, $E_V[j]$; j=3) at the time tc and the average shake amount data ($E_H[j]$, $E_V[j]$; j=5) at the time td in accordance with Equation (2).

$$V_{2H} = \frac{E_H[j]_{j=3} - E_H[j]_{j=5}}{tc - td}$$ [Equation 2]

$$V_{2V} = \frac{E_V[j]_{j=3} - E_V[j]_{j=5}}{tc - td}$$

Then, a shake acceleration rate ($\alpha_H$, $\alpha_V$) is calculated based on the above shake speeds ($V_{1H}$, $V_{1V}$), ($V_{2H}$, $V_{2V}$) in accordance with Equation (3).

$$\alpha_H = \frac{V_{1H} - V_{2H}}{ta - tc}$$ [Equation 3]

$$\alpha_V = \frac{V_{1V} - V_{2V}}{ta - tc}$$

Subsequently, the estimative shake amount calculator 513 calculates an estimative shake amount ($E_{PH}$, $E_{PV}$) based on the latest shake amount ($E_H[i]$, $E_V[i]$; i=0), the shake speeds ($V_{1H}$, $V_{1V}$), and the shake acceleration rate ($\alpha_H$, $\alpha_V$) in accordance with Equation (4).

$$E_{PH} = E_H[i]_{i=0} + V_{1H} \times T + k \times \tfrac{1}{2} \times \alpha_H \times T^2$$

$$E_{PV} = E_V[i]_{i=0} + V_{1V} \times T + k \times \tfrac{1}{2} \times \alpha_V \times T^2$$ [Equation 4]

Figure 9:
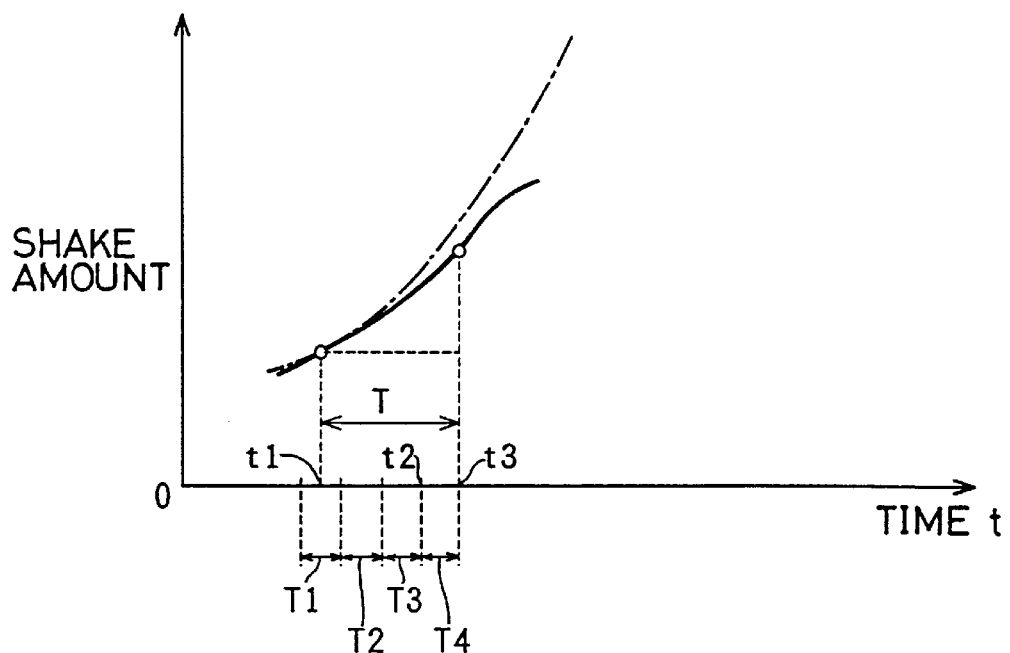
FIG. 9 is a diagram showing a time T used for calculating an estimative shake amount.

FIG. 9 shows a time T for calculating an estimative shake amount in accordance with Equation (4). The solid curve shows an actual camera shake, and the dashed curve shows an estimative shake based on the assumption that the camera shake is uniformly accelerated motion. In this embodiment, an estimative shake amount is calculated based on the assumption that a shake detection by the shake detecting section 4 starts at a middle point of time t1 of an integration time T1. An actual shake correction based on the shake amount obtained at the time t1 starts at a point of time t2, and the correction lens reaches a target position at a point of time t3. More specifically, T2 is a time required for transferring instant image data, T3 is a time required for calculating the estimative shake amount, and T4 is a time required for completing a shake correction after driving the shake correction lens unit 3 by the driving section 6. The time t2 is a point of time after the time T1×½+T2+T3 from the point of time t1, and the time t3 is a point of time after the time T4 from the point of time t2. In this embodiment, as shown in Equation (4), the estimative shake amount calculator 513 calculates an estimative shake amount after the point of time t3 when the correction lens reaches a target position to correct the shake amount estimated at the point of time t2.

The time T is calculated in the time T3. The time T1 is a whole duration of time counted from the start of an integration to the end thereof. The time T2 is a whole duration of time counted from the start of data transfer to the end thereof. The time T4 is a predetermined value which varies according to the characteristic performance of the driving section 6. The time T3 varies, in a strict sense, depending on the calculation manner. However, the variation due to the calculation manner is very small, i.e., difference in the order of several to several tens microseconds. Accordingly, in this embodiment, a predetermined constant is given for the time T3.

Figure 10:
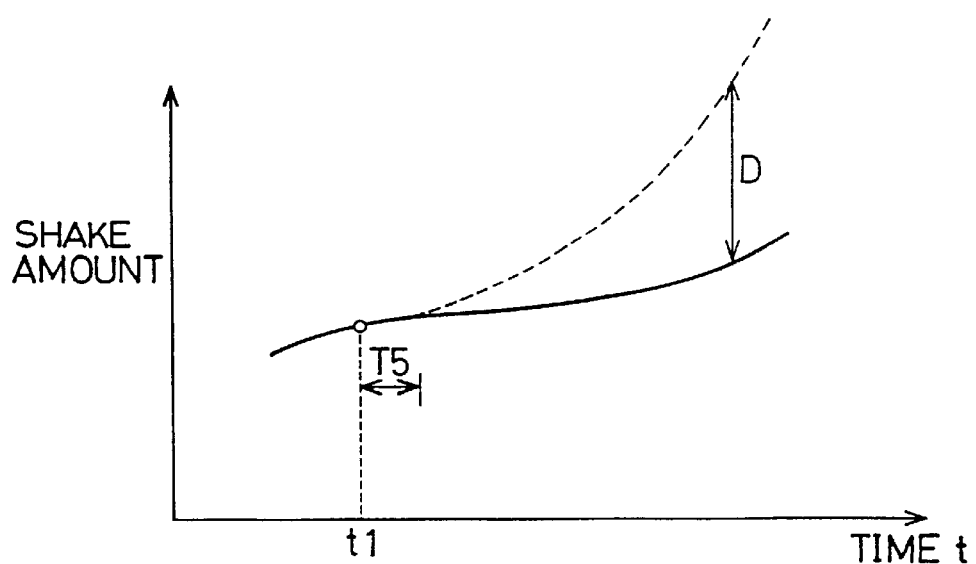
FIG. 10 is a diagram explaining a coefficient included in a quadratic term concerning an acceleration.

Further, in this embodiment, a coefficient k (0<k<1) is added in the quadratic term pertaining to the shake acceleration rate $\alpha$, as shown in (k×½×α×T²) in Equation (4) FIG. 10 explains the necessity of addition of the coefficient k in the quadratic term concerning the acceleration rate. Similar to FIG. 9, the solid curve shows an actual camera shake, and the dashed curve shows an estimative shake on the assumption of uniformly accelerated motion. As shown by the dashed curve, in the case of calculation based on the assumption of uniformly accelerated motion, the estimation is completed in a short time T5 from the start time t1 at which a shake detection is executed. However, the actual camera shake, as shown by the solid curve, does not change with time in similar way to the estimation. This is because the acceleration rate varies at all the time and the direction of acceleration also varies, consequently involving a complicated motion. In particular, the acceleration rate greatly varies at the time when the shake direction changes.

Accordingly, in the estimation based on the assumption of uniformly accelerated motion, the quadratic term (k×½×α×T²) concerning the acceleration greatly affects the estimation, causing a greater difference D between the estimative shake amounts shown by the dashed curve and the actual shake shown by the solid curve as time elapses. To avoid such difference D, in this embodiment, the coefficient k is added in the quadratic term concerning the acceleration, that is, the coefficient k is multiplied as shown in Equation (4), to make an estimative shake amount ($E_{PH}$, $E_{PV}$) near to the actual camera shake. The coefficient k is preferably set at about 0.5 according to simulation experiments.

Referring back to FIG. 1, the data converter 52 converts estimative shake amount data with respect to the horizontal and vertical directions into target angular position data with respect to the horizontal and vertical directions for the correction lens unit 3 using a conversion coefficient stored in the memory 56. This converter 52 also calculates a correction coefficient based on the ambient temperature detected by the temperature sensor 55 and corrects the target angular position data using this correction coefficient. This correction coefficient is used to correct variations in the focal length of the detection lens 41 caused by a change in the ambient temperature and the refractive index of the correction lens.

The target position setter 53 converts the corrected target angular position data into target position information concerning target positions into which the horizontal shake correction lens 31 and the vertical shake correction lens 32 are moved. These target positions in the horizontal and vertical directions are set in the driving section 6 as control data $SD_{PH}$, $SD_{PV}$.

The correction gain setter 54 calculates gain correction amounts in the horizontal and vertical directions based on the ambient temperature detected by the temperature sensor 55, and set them in the driving section 6 as control data $SD_{GH}$, $SD_{GV}$. The gain correction amounts in the horizontal and vertical directions are adapted to correct basic gains in the horizontal and vertical directions in the driving section 6. The basic gains and the control data $SD_{GH}$, $SD_{GV}$ are described in detail later.

The position data input device 57 obtains the respective positions of the horizontal and vertical shake correction lenses 31, 32 by A/D converting the respective output signals of the position detector 7. An abnormality in the lens driving system of the correction lens unit 3 is found by checking the positions of the shake correction lenses.

The driving section 6 includes a drive control circuit 61, a horizontal actuator 62, and a vertical actuator 63. The drive control circuit 61 generates horizontal and vertical direction drive signals based on the control data $SD_{PH}$, $SD_{PV}$, $SD_{GH}$, $SD_{GV}$ from the target position setter 53 and the correction gain setter 54. The horizontal and vertical actuators 62, 63 each include a coreless motor or the like and drive the horizontal and vertical shake correction lenses 31, 32 in accordance with the horizontal and vertical direction drive signals generated by the drive control circuit 61.

Figure 11:
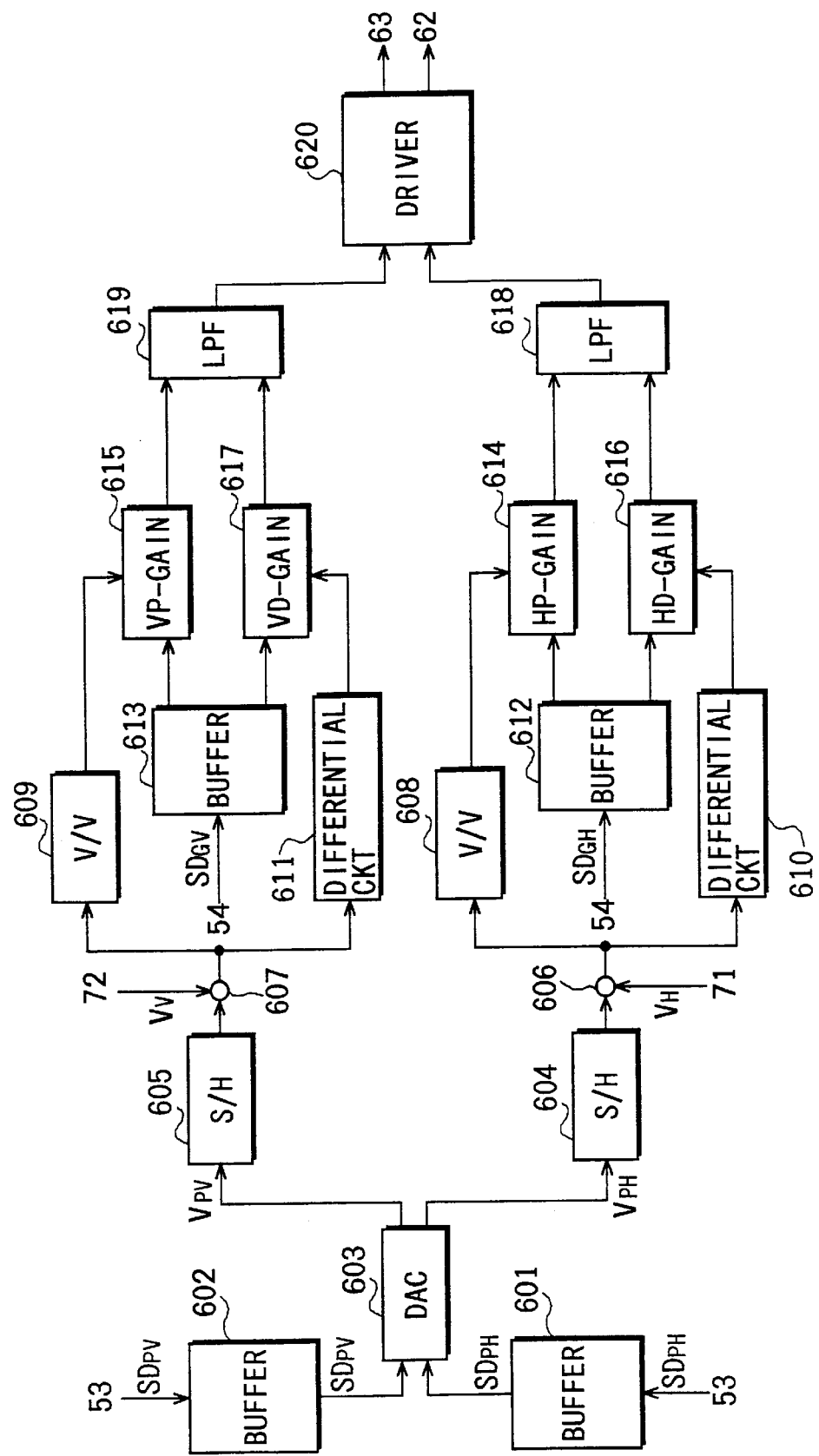
FIG. 11 is a block diagram showing a drive control circuit constituting a part of a servo control system provided in the camera.

Next, the drive control circuit 61 of the driving section 6 is described with reference to FIG. 11. FIG. 11 is a block diagram showing a construction of the drive control circuit 61 constituting part of a servo control system. First, the data $SD_{GH}$, $SD_{GV}$ set in the drive control circuit 61 are described. In the camera 1, a variation occurs in the driving performance of the lens driving system when the ambient temperature changes. For example, as the ambient temperature changes, the torque ratios of the motors (e.g., the motor 632 shown in FIG. 2), the backlash of the lens driving system of the correction lens unit 3 and the driving section 6, and the stiffness of the gears (e.g., rack gear 322 and pinion gear 631) of the lens driving system change.

Figure 12:
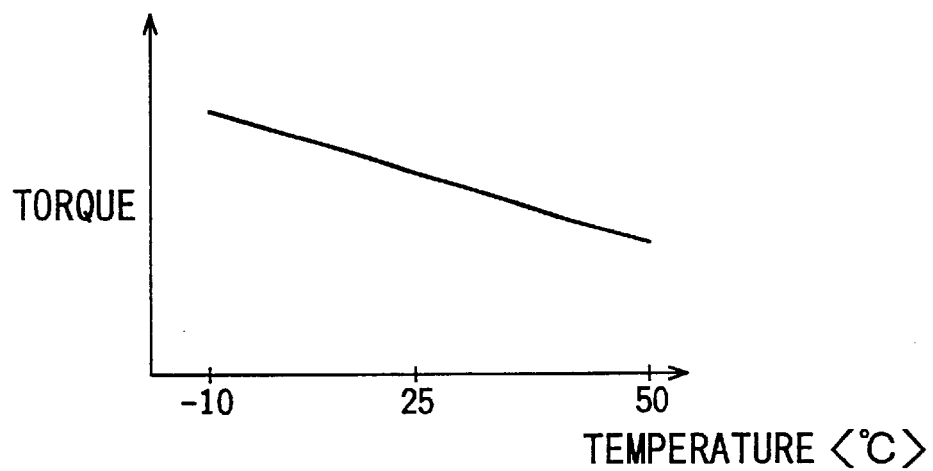
FIG. 12 is a graph showing a temperature characteristic of a drive motor provided in the camera, affecting the lens driving performance.

FIG. 12 is a graph showing a change in the driving performance (torque) of the motor with a temperature variation. As can be understood from FIG. 12, when the ambient temperature becomes different from a reference temperature (e.g., 25° C.), the motor torque changes from a value at the reference temperature. As a result, the driving performance of the lens driving system changes. In other words, the driving performance based on the basic gain of the horizontal and vertical direction (drive gains at the reference temperature) changes as the ambient temperature detected by the temperature sensor 55 changes from the reference temperature.

Accordingly, the correction gain setter 54 is so constructed as to generate gain correction data for correcting a variation in the driving performance based on the basic gain of horizontal and vertical direction in accordance with an ambient temperature detected by the temperature sensor 55. In this embodiment, there are provided functions to obtain gain correction data for individually compensating for variations in the motor torque, backlash and gears with a change in the ambient temperature from the reference temperature. The ambient temperatures detected by the temperature sensor 55 are put in the respective correction functions with respect to horizontal and vertical directions, and a sum of calculated values is obtained as a gain correction amount. The gain correction amounts with respect to horizontal and vertical directions are set in the drive control circuit 61 as the control data $SD_{GH}$, $SD_{GV}$.

Next, the drive control circuit 61 is described. Although the control data $SD_{GH}$, $SD_{GV}$ are shown to be transmitted via two signal lines in FIG. 1 to simplify the drawing, they are actually sent by serial transmission via unillustrated two data lines (SCK, SD) and three control lines (CS, DA/GAIN, X/Y). Similarly, the control data $SD_{PH}$, $SD_{PV}$ are alternately transmitted to the drive control circuit 61.

The drive control circuit 61 includes buffers, sample-and-hold circuits. In other words, buffers 601, 602 are memories for storing the data $SD_{PH}$, $SD_{PV}$ alternately set by the target position setter 53.

A digital-to-analog converter (DAC) 603 converts the control data $SD_{PH}$ in the buffer 601 and the control data $SD_{PV}$ in the buffer 602 into a target position voltage $V_{PH}$ and a target position voltage $V_{PV}$, respectively. A sample-and-hold (S/H) circuit 604 samples the target position voltage $V_{PH}$ converted by the DAC 603 and holds this value till a next sampling. Likewise, a S/H circuit 605 samples the target position voltage $V_{PV}$ converted by the DAC 603 and holds this value till a next sampling.

An adder circuit 606 calculates a difference between the target position voltage $V_{PH}$ and an output voltage $V_H$ of the horizontal position detector 71. An adder circuit 607 calculates a difference between the target position voltage $V_{PV}$ and an output voltage $V_V$ of the vertical position detector 72.

In other words, the adder circuits 606, 607 obtain voltage differences by addition since the output voltages $V_H$, $V_V$ are obtained as negative voltages in the horizontal and vertical position detectors 71, 72.

Identified by V/V 608 is an amplifier for amplifying an input voltage to a voltage as a horizontal direction proportional gain at a ratio set in advance for the reference temperature. Identified by V/V 609 is an amplifier for amplifying an input voltage to a voltage as a vertical direction proportional gain at a ratio set in advance for the reference temperature. Here, the horizontal direction proportional gain is a gain proportional to a difference between the target position of the horizontal shake correction lens 31 and the position of the horizontal shake correction lens 31 detected by the horizontal position detector 71. Further, the vertical direction proportional gain is a gain proportional to a difference between the target position of the vertical shake correction lens 32 and the position of the vertical shake correction lens 32 detected by the vertical position detector 72.

A differential circuit 610 multiplies the voltage difference obtained by the adder circuit 606 by a differential by a time constant set in advance for the reference temperature to obtain a voltage as a horizontal direction differential gain. The thus obtained voltage corresponds to a horizontal direction speed difference (a difference between a target driving speed and a present driving speed). Similarly, a differential circuit 611 multiplies the voltage difference obtained by the adder circuit 607 by a differential by a time constant set in advance for the reference temperature to obtain a voltage as a vertical direction differential gain. The thus obtained voltage corresponds to a vertical direction speed difference (a difference between a target driving speed and a present driving speed).

In this way, the proportional and differential gains as the basic gains corresponding to the reference temperature are set with respect to horizontal and vertical directions by the amplifiers 608, 609 and the differential circuits 610, 611.

A buffer 612 is a memory for storing the control data $SD_{GH}$ of the correction gain setter 54. The control data $SD_{GH}$ is gain correction amounts (proportional and differential gain correction amounts) for correcting the horizontal direction basic gain (proportional and differential gains). A buffer 613 is a memory for storing the control data $SD_{GV}$ of the correction gain setter 54. The control data $SD_{GV}$ is gain correction amounts (proportional and differential gain correction amounts) for correcting the vertical direction basic gain (proportional and differential gains).

A HP gain correcting circuit 614 outputs a horizontal direction proportional gain after a temperature correction by adding an analog voltage corresponding to the horizontal direction proportional gain correction amount from the buffer 612 to the horizontal direction proportional gain obtained in the amplifier 608. Further, a VP gain correcting circuit 615 outputs a vertical direction proportional gain after the temperature correction by adding an analog voltage corresponding to the vertical direction proportional gain correction amount from the buffer 613 to the vertical direction proportional gain obtained in the amplifier 609.

A HD gain correcting circuit 616 outputs a horizontal direction differential gain after the temperature correction by adding an analog voltage corresponding to the horizontal direction differential gain correction amount from the buffer 612 to the horizontal direction differential gain obtained in the differential circuit 610. Further, a VD gain correcting circuit 617 outputs a vertical direction differential gain after the temperature correction by adding an analog voltage corresponding to the vertical direction differential gain correction amount from the buffer 613 to the vertical direction differential gain obtained in the differential circuit 611.

In this way, the proportional and differential gains as the basic gains are corrected according to temperature by the HP, VP, HD and VD gain correcting circuits 614, 615, 616 and 617.

A low pass filter (LPF) 618 removes high frequency noises included in the respective output voltages of the HP and HD gain correcting circuits 614, 616. A low pass filter (LPF) 619 removes high frequency noises included in the respective output voltages of the VP and VD gain correcting circuits 615, 617.

A driver 620 is an IC for the driving of the motor which supplies drive voltages corresponding to the output voltages of the LPFs 618, 619 to the horizontal and vertical actuators 62, 63, respectively.

The position detecting section 7 shown in FIG. 1 includes the horizontal and vertical position detectors 71, 72, which are adapted to detect the present or current positions of the horizontal and vertical shake correction lenses 31, 32, respectively.

Figure 13:
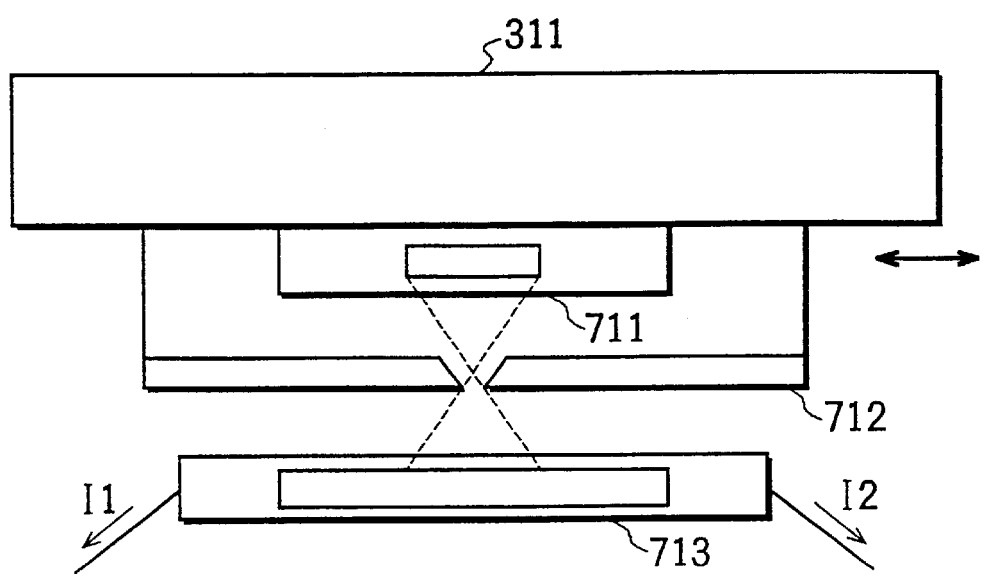
FIG. 13 is a schematic diagram of a horizontal position detector.

FIG. 13 is a schematic diagram of the horizontal position detector 71. The horizontal position detector 71 includes an LED (light-emitting diode) 711, a cover member 712 having a slit and a PSD (position sensing device) 713. The LED 711 is mounted in a position of the frame 311 of the horizontal shake correction lens 31 where the gear portion 312 is formed, and the cover member 712 having the slit is adapted to sharpen the directivity of the light emitted from a light emitting portion of the LED 711. The PSD 713 is mounted in a position of the inner wall of the lens barrel 24 of the camera main body opposite to the LED 711. This PSD 713 outputs photoelectrically converted currents I1, I2 of values corresponding to a light sensing position (center of gravity position) of the beams emitted from the LED 711. The position of the horizontal shake correction lens 31 is detected by measuring a difference between the photoelectrically converted currents I1 and I2. The vertical position detector 72 is similarly constructed so as to detect the position of the vertical shake correction lens 32.

Figure 14:
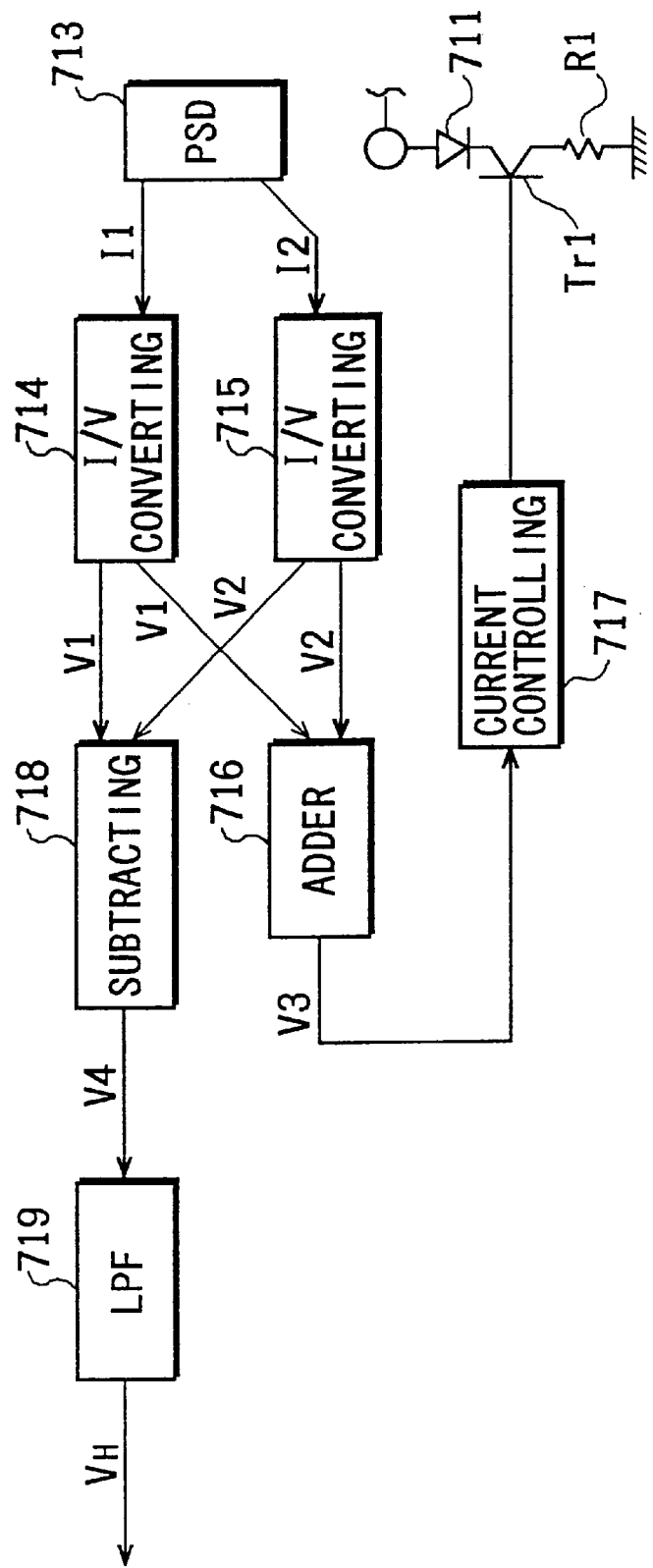
FIG. 14 is a block diagram of the horizontal position detector.

FIG. 14 is a block diagram of the horizontal position detector 71. In addition to the LED 711 and the PSD 713, the horizontal position detector 71 includes current-to-voltage (I/V) converting circuits 714, 715, an adder circuit 716, a current controlling circuit 717, a subtracting circuit 718, a low pass filter (LPF) 719, and the like. The I/V converting circuits 714, 715 respectively convert the output currents I1, I2 of the PSD 713 into voltages V1, V2. The adder circuit 716 calculates a sum voltage V3 of the output voltages V1, V2 of the I/V converting circuits 714, 715. The current controlling circuit 717 increases and decreases a base current to a transistor Tr1 so as to hold the output voltage V3 of the adder circuit 716, i.e., the amount of light emitted from the LED 711 constant. The subtracting circuit 718 calculates a difference voltage V4 of the output voltages V1, V2 of the I/V converting circuits 714, 715. The LPF 719 removes high frequency components included in the output voltage V4 of the subtracting circuit 718.

Next, the detection by the horizontal position detector 71 is described. The currents I1, I2 from the PSD 713 are converted into the voltages V1, V2 in the I/V converting circuits 714, 715, respectively. Subsequently, the voltages V1, V2 are added in the adder circuit 716. The voltage control circuit 717 supplies a voltage which makes the voltage V3 obtained by the addition always constant to the base of the transistor Tr1. The LED 711 emits light at an amount corresponding to this base current.

On the other hand, the voltages V1, V2 are subtracted in the subtracting circuit 718. The voltage V4 obtained by this subtraction is a value representing the position of the horizontal shake correction lens 31. For example, in the case that the light sensing position (center of gravity) is away to the right from the center of the PSD 713 by a length x, the length x, the currents I1, I2 and a length L of a light sensing area of the PSD 713 satisfy a relationship defined by Equation (5).

$$\frac{I2-I1}{I2+I1} = \frac{2 \cdot x}{L} \qquad \text{[Equation 5]}$$

Similarly, the length x, the voltages V1, V2 and the length L of the light sensing area satisfy a relationship defined by Equation (6).

$$\frac{V2-V1}{V2+V1} = \frac{2 \cdot x}{L} \qquad \text{[Equation 6]}$$

If control is performed so as to make a value of V1+V2, i.e., a value of the voltage V3 always constant, there can be obtained a relationship defined by Equation (7), in which a value of V2−V1, i.e., a value of the voltage V4 represents the length x. Accordingly, the position of the horizontal shake correction lens 31 can be detected if the voltage V4 is checked.

$$V2-V1 \propto x \qquad \text{[Equation 7]}$$

The shake sensor controller 43, the signal processor 44, the shake data processor 51, the data converter 52, the target position setter 53, the correction gain setter 54, and the position data input device 57 may be totally constructed by a micro processing unit (MPU) which implements other various operations of the camera 1 as described in the following section. Alternatively, one or several of these components may be respectively constructed by a number of MPUs, respectively.

Next, an operation of the camera is described. Beams of light coming from an object passes through the detection lens 41, and focuses on the light receiving surface of the shake sensor 42 as an object light image. The object light image is read as an image signal in accordance with a control of the shake sensor controller 43 each time the shake sensor 42 senses the object image for an integration time. The thus obtained image signal is converted into image data by the signal processor 44.

The image data is written on a specified address of the memory 56. The actual shake amount calculating device 511c calculates a shake amount ($E_H[i]$, $E_V[i]$) in horizontal and vertical directions based on image data written on the memory 56, and the average shake amount calculating device 511d calculates an average shake amount based on the shake amount and a shake amount prior thereto. The thus obtained average shake amount in the horizontal and vertical directions is stored in the memory 56. Thereafter, four shake amount data including latest shake amount data in the horizontal and vertical directions are extracted from the memory 56.

Figure 15:
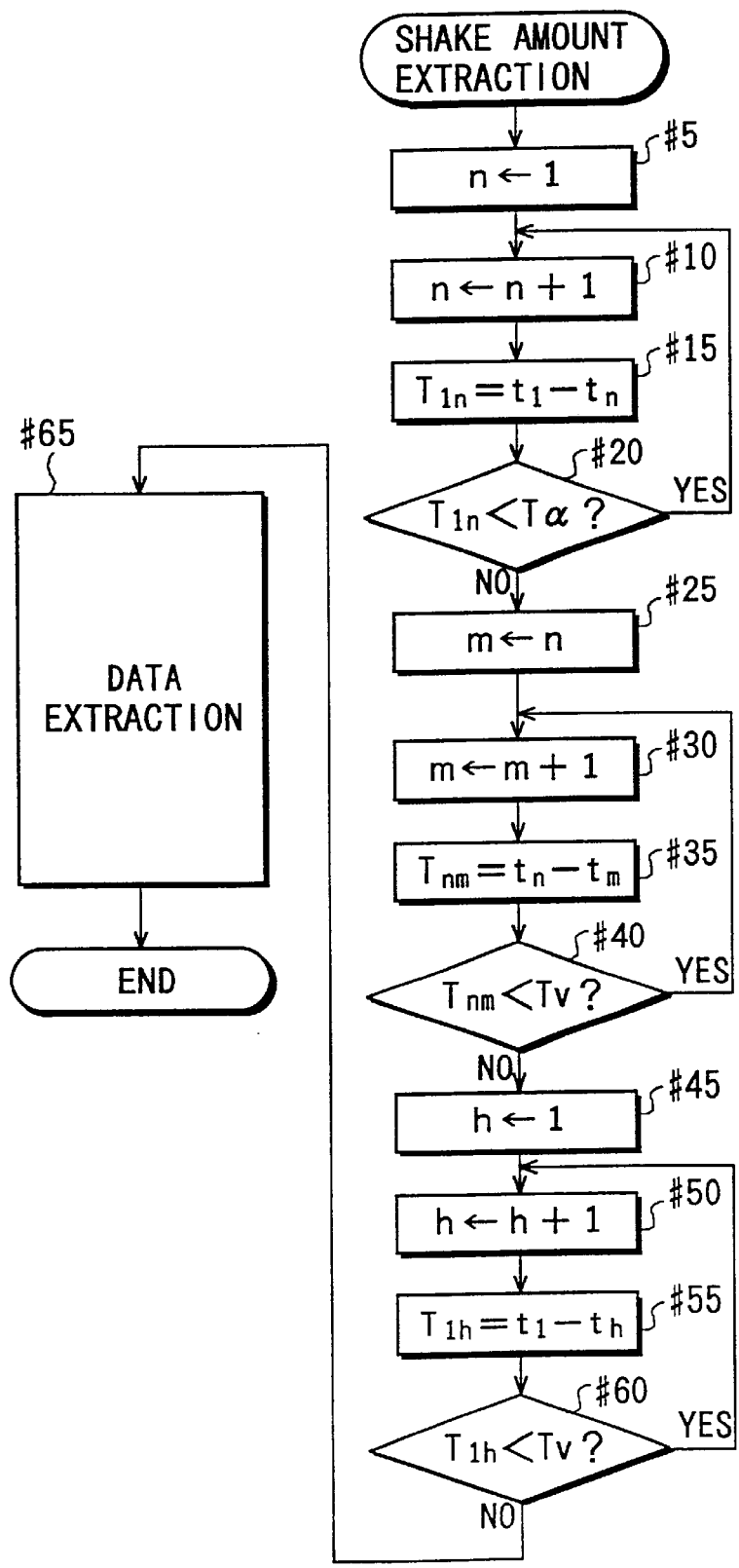
FIG. 15 is a flowchart showing a routine "Shake Amount Extraction".

FIG. 15 is a flowchart showing a routine "Shake Amount Extraction". When this routine starts, a counter value n is set at "1" (in Step #5), and the counter value n is incremented by 1 (in Step #10). A time space $T_{1n}$ (=t1−tn) is calculated (in Step #15). It should be appreciated that time t1 corresponds to the time (i=0) in FIG. 8, and time tn (n is the counter value) corresponds to the time (j=n) in FIG. 8.

Subsequently, it is judged whether the time space $T_{1n}$ is shorter than the time space Tα (in Step #20). When it is judged that $T_{1n}<T\alpha$ (YES in Step #20), this routine returns to Step #10. If it is judged that $T_{1n} \geq T\alpha$ (NO in Step #20), the counter value n is set at m (in Step #25). Thereby, the counter value m is stored, and the search of the time tc in FIG. 8 is completed.

Thereafter, the counter value m is incremented by 1 (in Step #30), and a time space $T_{nm}$ (=tn−tm) is calculated (in Step #35). It should be appreciated that time tm (m is the counter value) corresponds to the time (j=m) in FIG. 8.

Subsequently, it is judged whether the time $T_{nm}$ is shorter than the time space Tv (in Step #40). If it is judged that $T_{nm}<Tv$ (YES in Step #40), the routine returns to Step #30. If it is judged that $T_{nm} \geq Tv$ (NO in Step #40), a counter value h is set at "1" (in Step #45). The counter value h is stored, and the search of the time td in FIG. 8 is completed.

Thereafter, the counter value h is incremented by 1 (in Step #50), and a time space $T_{1h}$ (=t1−th) is calculated (in Step #55). It should be appreciated that time th (h is the counter value) corresponds to the time (j=h) in FIG. 8.

Subsequently, it is judged whether the time space $T_{1h}$ is shorter than the time space Tv (in Step #60). When it is judged that $T_{1h}<Tv$ (YES in Step #60), the routine returns to Step #50. If it is judged that $T_{1h} \geq Tv$ (NO in Step #60), the routine goes to Step#65 where data extraction is executed. At this time, the search of the time tb in FIG. 8 is completed, and the time tb is specified by the counter value h.

In Step #65, the shake amount at the time tn specified by the counter value n in the case of the judgement result in Step #20 being negative is extracted and set as the shake amount at the time tc in FIG. 8. Likewise, the shake amount at the time tm specified by the counter value m in the case of the judgement result in Step #40 being negative is extracted and set as the shake amount at the time td in FIG. 8. Further, the shake amount at the time th specified by the counter value h in the case of the judgement result in Step #60 being negative is extracted and set as the shake amount at the time tb shown in FIG. 8. The shake amount at the latest time t1 (ta) is always extracted. After extracting all the data in Step #65, the routine ends.

When the four shake amount data including the latest shake amount data are extracted in the horizontal and vertical directions, the shake speeds V1, V2 and the shake acceleration rate α are obtained. Then, estimative shake amount data is calculated in the horizontal and vertical directions in accordance with Equation (4).

Thereafter, the estimative shake amount data in the horizontal and vertical directions is converted into target angular position data in the horizontal and vertical directions and corrected based on an ambient temperature detected by the temperature sensor 52. The corrected target angular position data is converted into target position data concerning target positions in the horizontal and vertical directions. Thereafter, these target positions are set in the driving section 6 as control data $SD_{PH}$, $SD_{PV}$.

The correction gain setter 54 calculates gain correction amounts in the horizontal and vertical directions based on the ambient temperature detected by the temperature sensor 52, and set them in the driving section 6 as control data $SD_{GH}$, $SD_{GV}$. The correction lens unit 3 is moved in such a direction as to cancel the shake amount of the camera main body relative to the object based on the control data $SD_{PH}$, $SD_{PV}$, $SD_{GH}$, $SD_{GV}$ set in the driving section 6.

In this embodiment, the CCD area sensor is used as the shake sensor 42. However, it may be appreciated to use an angular velocity sensor in place of the CCD area sensor.

As mentioned above, in the estimation, the correction coefficient k (0<k<1) is added in the quadratic term pertaining to the shake acceleration rate α. Accordingly, a more accurate estimation can be attained. Also, shake amount data are generated in accordance with the reference interval, and necessary shake amount data for estimation are extracted from such generated shake amount data. Accordingly, estimation can be performed based on shake amount data free from the influence of variations in the brightness of an object, thereby ensuring an accurate shake correction.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An apparatus comprising:
a detector which detects a shake amount of the apparatus with respect to an object at an interval;
a selector which selects, in accordance with a predetermined reference time space before a particular detection time point, a plurality of shake amounts among shake amounts detected by the detector; and
a calculator which executes calculation on a shake of the apparatus based on detected shake amounts selected by the selector.

2. An apparatus according to claim 1, wherein the selector selects a shake amount detected at a detection time point which is prior to the predetermined reference time space before the particular detection time point, and is closest to the particular detection time point.

3. An apparatus according to claim 1, wherein the selector selects a shake amount detected at a detection time point which is within the predetermined reference time space before the particular detection time point, and is farthest from the particular detection time point.

4. An apparatus according to claim 1, wherein the selector selects a shake amount detected at a detection time point which is closest to the predetermined reference time space before the particular detection time point.

5. An apparatus according to claim 1, wherein the calculator calculates an estimative shake amount based on detected shake amounts selected by the selector.

6. An apparatus according to claim 5, wherein the calculator calculates a shake speed based on detected shake amounts selected by the selector, and calculates an estimative shake amount based on a calculated shake speed.

7. An apparatus according to claim 5, further comprising a corrector which executes a shake correction in accordance with a calculated estimative shake amount.

8. An apparatus according to claim 1, which is a camera.

* * * * *

UNITED STATES PATENT AND TRADEMARK OFFICE
CERTIFICATE OF CORRECTION

PATENT NO. : 6,747,691 B1
DATED : June 8, 2004
INVENTOR(S) : Tomonori Satoh et al.

It is certified that error appears in the above-identified patent and that said Letters Patent is hereby corrected as shown below:

Title page,
Item [75], Inventors, delete "Tomonori Satoh, Osaka (JP); Yoshihiro Hara, Osaka (JP); Toshihiro Hamamura, Osaka (JP)" and insert -- Tomonori Satoh, Sakai-Shi (JP); Yoshihiro Hara, Kishiwada-Shi (JP); Toshihiro Hamamura, Osaka-Shi (JP) --.

Column 5,
Line 41, delete ""▼"", and insert -- "▲" --.
Line 48, delete "▼,", and insert -- ▲, --.

Signed and Sealed this

Fifth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,747,691 B1
DATED : June 8, 2004
INVENTOR(S) : Tomonori Satoh et al.

It is certified that error appears in the above-identified patent and that said Letters Patent is hereby corrected as shown below:

<u>Column 14,</u>
Lines 51-54, delete
"An apparatus according to claim 5, wherein the calculator calculates a shake speed based on detected shake amounts selected by the selector, and calculates an estimative shake amoun based on a calculated shake speed." and insert
-- An apparatus comprising: a detector which detects a shake amount of the apparatus with respect to an object at an interval; a selector which selects, in accordance with a predetermined reference time space before a particular detection time point, a plurality of shake amounts among shake amounts detected by the detector; and a calculator which executes calculation on a shake of the apparatus based on detected shake amounts selected by the selector; wherein the calculator calculates an estimative shake amount based on detected shake amounts selected by the selector; and wherein the calculator calculates a shake speed based on detected shake amounts selected by the selector, and calculates an estimative shake amount based on a calculated shake speed. --.

Signed and Sealed this

Twenty-seventh Day of December, 2005

JON W. DUDAS
*Director of the United States Patent and Trademark Office*